US009573516B2

(12) United States Patent
Salter et al.

(10) Patent No.: US 9,573,516 B2
(45) Date of Patent: Feb. 21, 2017

(54) REAR VEHICLE LIGHTING SYSTEM

(71) Applicant: Ford Global Technologies, LLC, Dearborn, MI (US)

(72) Inventors: Stuart C. Salter, Grand Rapids, MI (US); James J. Surman, Clinton Township, MI (US); Vichit Chea, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 14/598,387

(22) Filed: Jan. 16, 2015

(65) Prior Publication Data

US 2015/0138817 A1  May 21, 2015

Related U.S. Application Data

(63) Continuation-in-part of application No. 14/086,442, filed on Nov. 21, 2013.

(51) Int. Cl.
*B60Q 1/26* (2006.01)
*B60Q 1/46* (2006.01)
*F21S 8/10* (2006.01)
*B60Q 1/30* (2006.01)
*B60Q 1/38* (2006.01)

(52) U.S. Cl.
CPC .................. *B60Q 1/46* (2013.01); *B60Q 1/268* (2013.01); *B60Q 1/302* (2013.01); *B60Q 1/38* (2013.01); *F21S 48/214* (2013.01)

(58) Field of Classification Search
CPC .............. B60K 35/00; B60K 2350/206; B60K 2350/2052; B60Q 1/302; B60Q 3/0213; B60Q 3/042; G02B 27/01; G02B 27/0101

USPC .................................................. 362/503, 510
See application file for complete search history.

(56) References Cited

U.S. PATENT DOCUMENTS

| | | | |
|---|---|---|---|
| 5,709,453 A | 1/1998 | Krent et al. | |
| 6,031,511 A | 2/2000 | DeLuca et al. | |
| 6,117,362 A | 9/2000 | Yen et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |

(Continued)

FOREIGN PATENT DOCUMENTS

| | | |
|---|---|---|
| CN | 201169230 Y | 12/2008 |
| CN | 101337492 A | 1/2009 |

(Continued)

OTHER PUBLICATIONS

"Photoluminesence vs. fluorescence," Fluorescent Signs, web page, http://fluorescentsigns.com/photoluminescence-vs-fluorescence.html, 2012, 1 page.

*Primary Examiner* — Jason Moon Han
(74) *Attorney, Agent, or Firm* — Vichit Chea; Price Heneveld LLP

(57) ABSTRACT

A rear vehicle light system is provided herein. The system includes a rear windshield and a plurality of photoluminescent structures that are each disposed at a rear windshield location and configured to luminesce in response to light excitation. A plurality of light sources are each configured to supply light to a uniquely associated photoluminescent structure and actuate based on a position of a turn signal lever.

20 Claims, 9 Drawing Sheets

(56) References Cited

U.S. PATENT DOCUMENTS

| | | |
|---|---|---|
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201169230 Y | 2/2009 |
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

REAR VEHICLE LIGHTING SYSTEM

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is hereby incorporated herein by reference.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a rear vehicle light system is provided. The system includes a rear windshield and a plurality of photoluminescent structures that are each disposed at a rear windshield location and configured to luminesce in response to light excitation. A plurality of light sources are each configured to supply light to a uniquely associated photoluminescent structure and actuate based on a position of a turn signal lever.

According to another aspect of the present invention, a rear vehicle light system is provided. The system includes a rear windshield and a plurality of photoluminescent structures that are each disposed at a rear windshield location and configured to luminesce in response to light excitation. A plurality of light sources are each configured to supply light to a uniquely associated photoluminescent structure and actuate in conjunction with a turn signal.

According to another aspect of the present invention, a rear vehicle light system is provided and includes a rear windshield and a plurality of photoluminescent structures that are each disposed at a rear windshield location and configured to luminesce in response to light excitation. A plurality of light sources are each configured to supply light to a uniquely associated photoluminescent structure and actuate in conjunction with one of a left turn signal and a right turn signal.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a rear vehicle lighting system that advantageously employs one or more photoluminescent structures configured to convert light received from an associated light source and re-emit the light at a different wavelength.

Figure 1A:
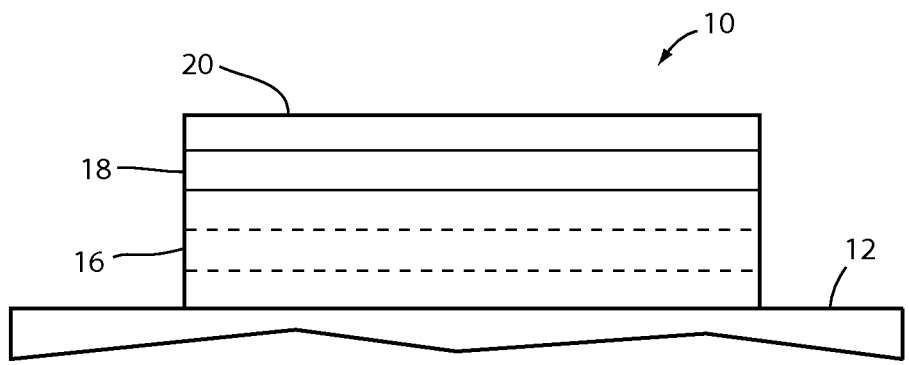
FIG. 1A illustrates a photoluminescent structure coupled to a substrate, according to one embodiment.
Figure 1B:
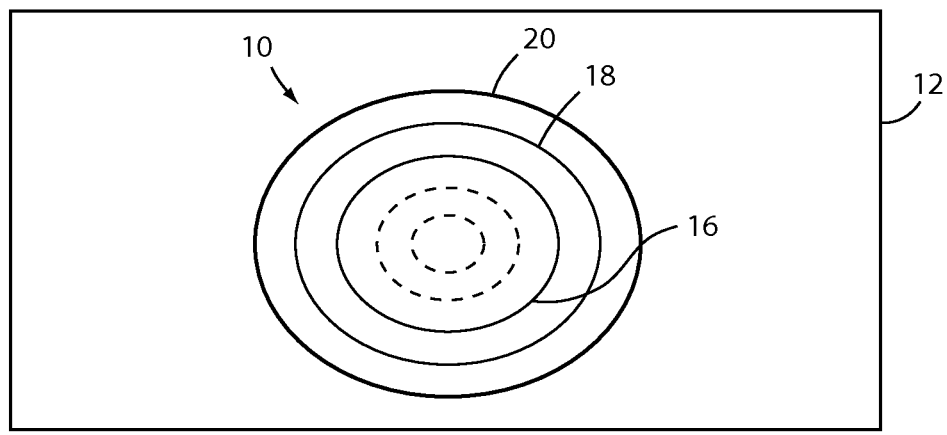
FIG. 1B illustrates a photoluminescent structure coupled to a substrate, according to another embodiment.
Figure 1C:
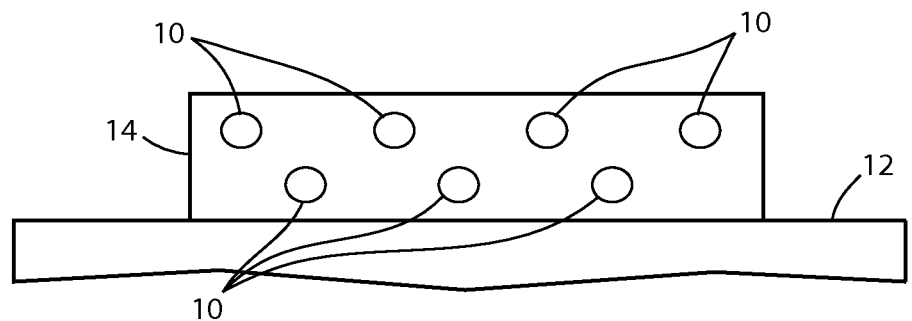
FIG. 1C illustrates a photoluminescent structure coupled to a substrate, according to yet another embodiment.

Referring to FIGS. 1A-1C, various exemplary embodiments of a photoluminescent structure 10 are shown, each capable of being coupled to a substrate 12, which may correspond to a vehicle fixture or vehicle related piece of equipment. In FIG. 1A, the photoluminescent structure 10 is generally shown rendered as a coating (e.g. a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g. a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photoluminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired substrate. The energy conversion layer 16 may be applied to a substrate by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g. the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are included herein by reference in their entirety.

Figure 2:
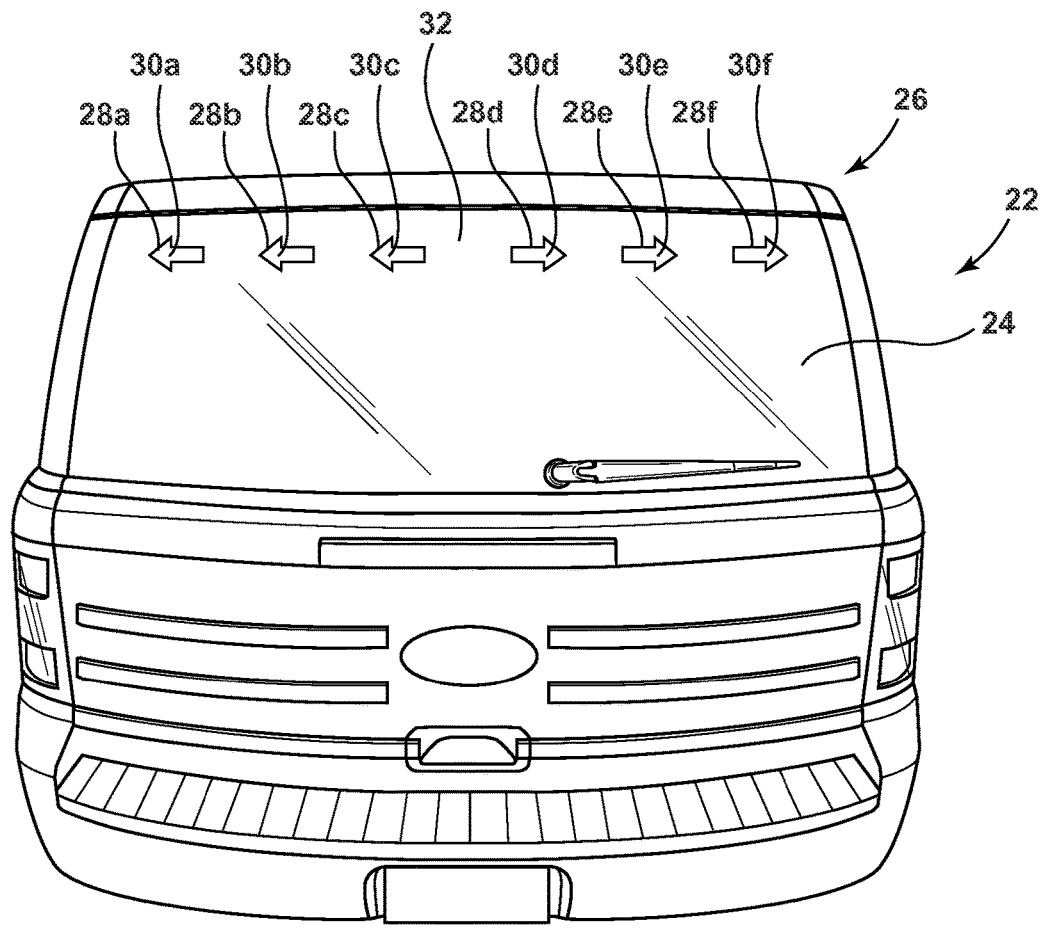
FIG. 2 illustrates a rear vehicle lighting system according to one embodiment.

Referring to FIG. 2, a rear vehicle light system 22 is shown according to one embodiment. The system 22 includes a rear windshield 24 of a vehicle 26 and a plurality of photoluminescent structures, shown as photoluminescent structures 28a-f, each disposed at a rear windshield location 30a-f and configured to luminesce in response to light excitation. The photoluminescent structures 28a-f may be disposed on an upper portion 32 of the rear windshield 24 and are generally not visible when in a non-excited state. According to the presently illustrated embodiment, photoluminescent structures 28a-c are arranged to indicate a left turn and photoluminescent structures 28d-f are arranged to indicate a right turn. For example, photoluminescent structures 28a-c may each be arranged as arrows aligned horizontally head-to-tail and pointing toward the left side of the vehicle 26 as viewed from the rear of the vehicle 26. Conversely, photoluminescent structures 28d-f may be arranged as arrows aligned horizontally head-to-tail and pointing toward the right side of the vehicle 26.

Figure 3:
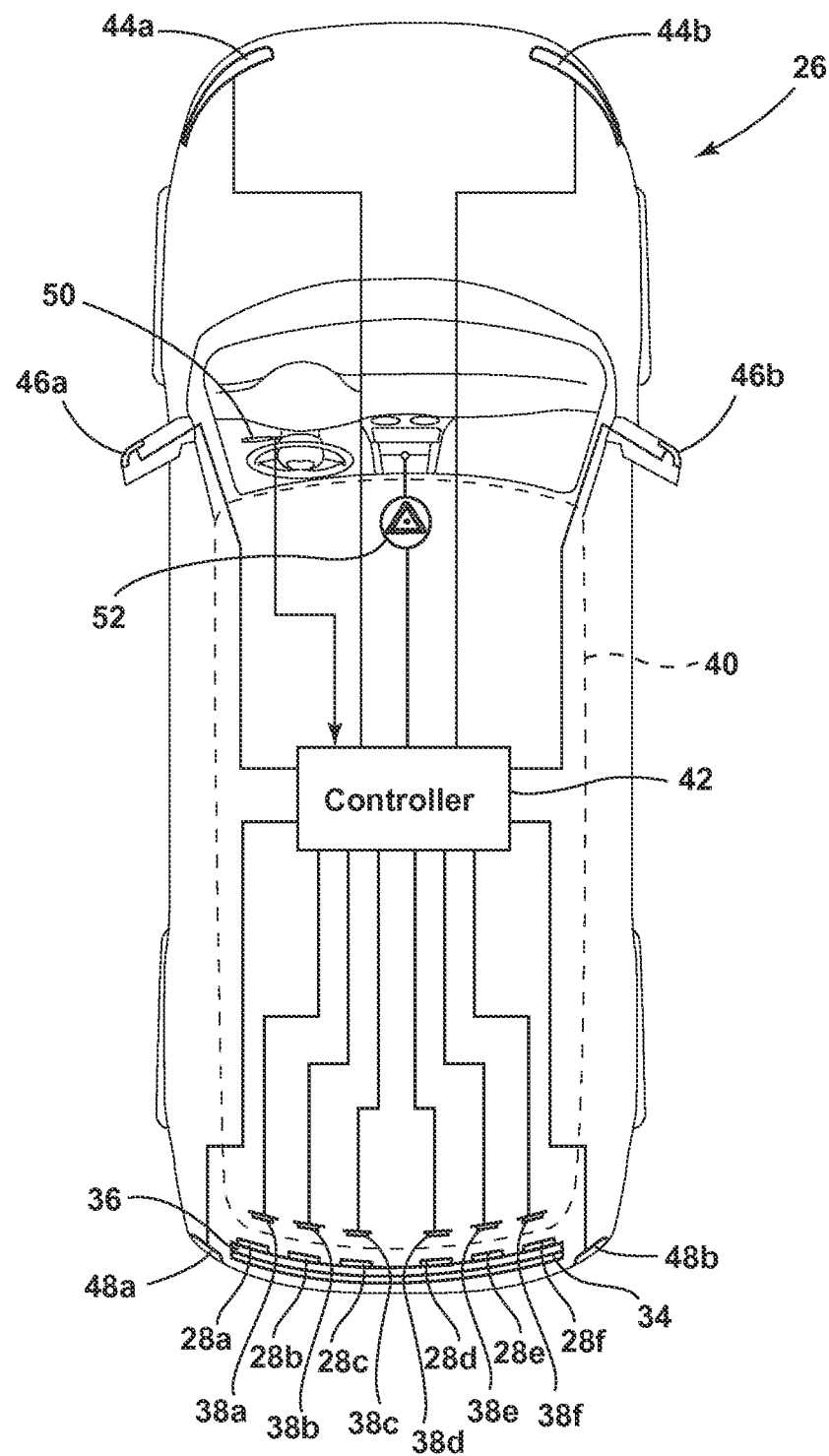
FIG. 3 is a top plan view of the vehicle lighting system shown in FIG. 2.

Referring to FIG. 3, each photoluminescent structure 28a-f may be applied to or otherwise arranged on a portion 34 of the rear windshield 24 facing the interior of the vehicle 26. According to one embodiment, the photoluminescent structures 28a-f may be applied to a light blocking layer 36 covering portion 34 of the rear windshield 24. The light blocking layer 36 may be embodied as a film configured to absorb ultraviolet (UV) radiation, thereby preventing sunlight from exciting the photoluminescent structures 28a-f. In alternative embodiments, the light blocking layer 36 may be configured to absorb light of a different wavelength(s).

Referring still to FIG. 3, a plurality of light sources, shown as light sources 38a-f, are each configured to supply light to a uniquely associated photoluminescent structure 28a-f. For example, light source 38a functions as the excitation source for photoluminescent structure 28a, light source 38b functions as the excitation source for photoluminescent structure 28b, light source 38c functions as the excitation source for photoluminescent structure 28c, and so on.

Referring still to FIG. 3, a plurality of light sources, shown as light sources 38a-f, are each configured to supply light to a uniquely associated photoluminescent structure

28*a-f*. For example, light source 38*a* functions as the excitation source for photoluminescent structure 28*a*, light source 38*b* functions as the excitation source for photoluminescent structure 28*b*, light source 38*c* functions as the excitation source for photoluminescent structure 28*c*, and so on. The light sources 38*a-f* may be coupled to a headliner 40 of the vehicle 26 and are selectively controlled by a controller 42 such as a vehicle body control module. As shown, the controller 42 also communicates and/or controls other vehicle equipment including, but not limited to, headlights 44*a*, 44*b*, side mirror lights 46*a*, 46*b*, taillights 48*a*, 48*b*, a turn signaling device (e.g., turn signal lever 50), and hazard switch 52.

In operation, the headlights 44*a*, 44*b*, side mirrors lights 46*a*, 46*b*, taillights 48*a*, 48*b*, and light sources 38*a-f* are actuated based on a position of the turn signal lever 50. For example, when the turn signal lever 50 is moved to a left turn position, the controller 42 may generate a left turn signal prompting headlight 44*a*, side mirror light 46*a*, and taillight 48*a* to blink in unison, thereby indicating a left vehicle turn. Additionally, light sources 38*a-c* may be actuated in conjunction with the left turn signal. According to one embodiment, light sources 38*a-c* are actuated to supply light to associated photoluminescent structures 28*a-c* such that the photoluminescent structures 28*a-c* luminesce intermittently. For instance, the light sources 38*a-c* may be simultaneously actuated to periodically emit light toward the associated photoluminescent structures 28*a-c* such that the photoluminescent structures 28*a-c* luminesce in a similar blinking pattern as headlight 44*a*, side mirror light 46*a*, and taillight 48*a*.

Figure 4:
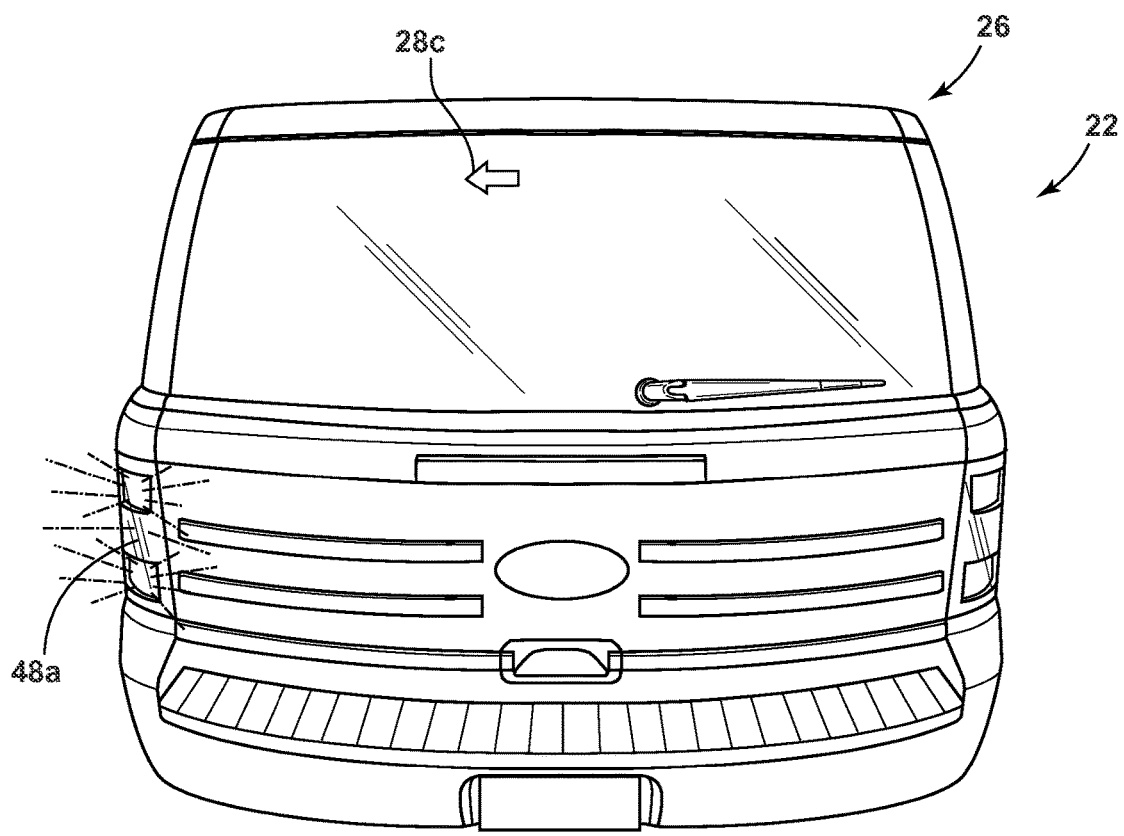
FIGS. 4-6 illustrate a luminescence pattern for indicating a left turn.
Figure 5:
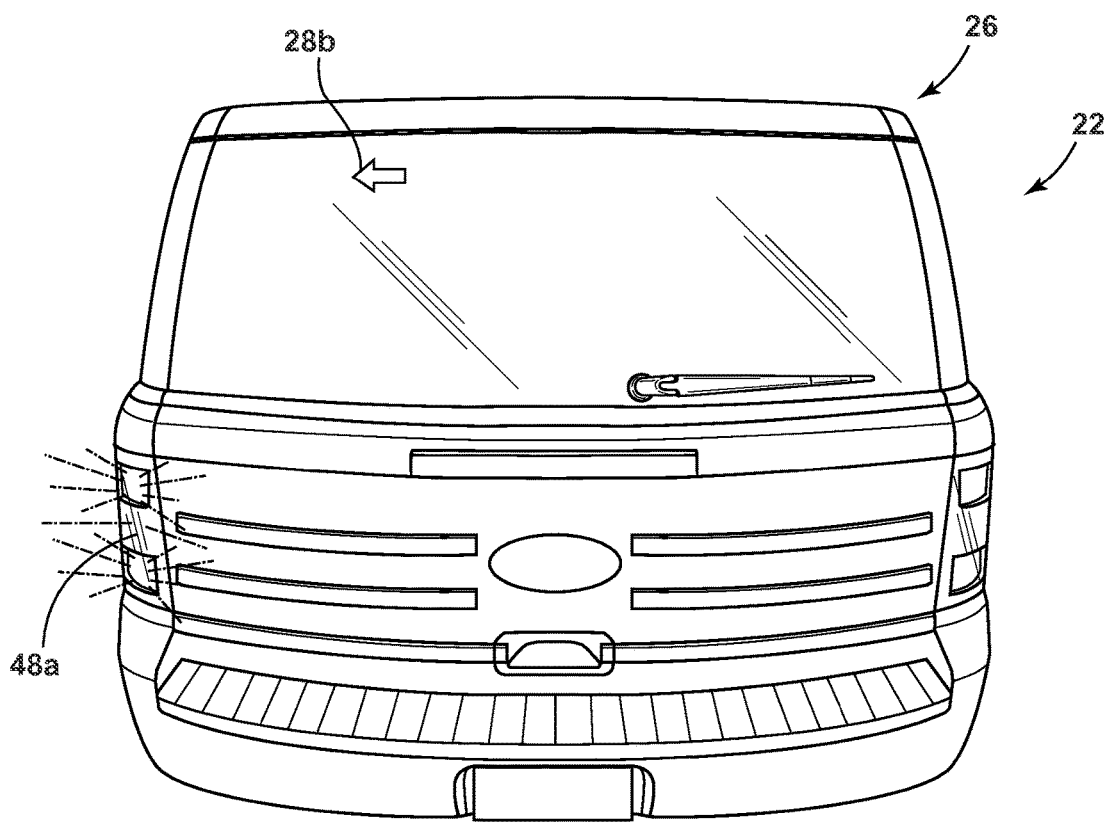
Figure 6:
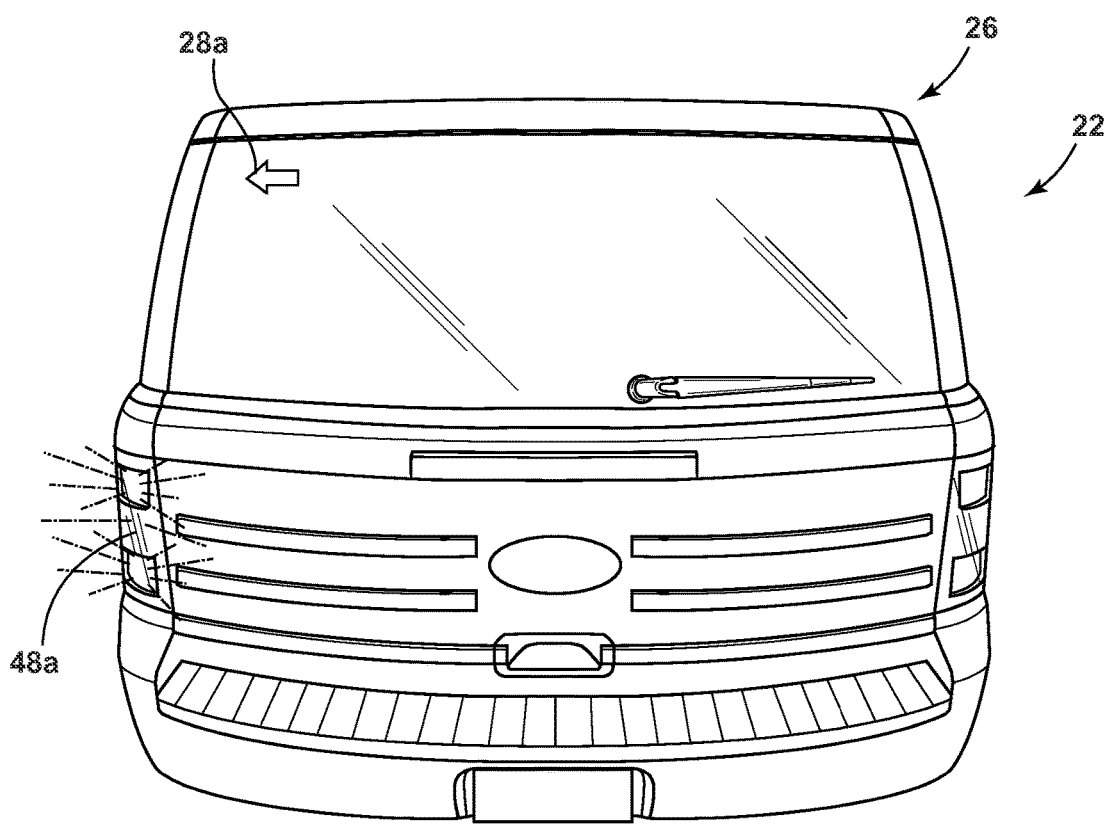

Alternatively, light sources 38*a-c* may each be actuated at different time intervals such that the associated photoluminescent structures 28*a-c* luminesce intermittently and in succession. For instance, when the turn signal lever 50 is moved to the left turn position, light source 38*c* may be exclusively actuated to induce luminescence of photoluminescent structure 28*c* for the approximate duration of the first blink of taillight 48*a* (FIG. 4). Thereafter, light source 38*b* may be exclusively actuated to induce luminescence of photoluminescent structure 28*b* for the approximate duration of the second blink of taillight 48*a* (FIG. 5). Finally, light source 38*a* may be exclusively actuated to induce luminescence of photoluminescent structure 28*a* for the approximate duration of the third blink of taillight 48*a* (FIG. 6). The aforementioned luminescence pattern may be repeated so long as the turn signal lever 50 remains in the left turn position, thereby giving the impression to an observer outside of the vehicle 26 that the arrows are repetitiously moving laterally across the vehicle 26.

When the turn signal lever 50 is moved to the right turn position, the controller 42 may generate a right turn signal prompting headlight 44*b*, side mirror light 46*b*, and taillight 48*b* to blink in unison, thereby indicating a right vehicle turn. Light sources 38*d-f* may also be actuated in conjunction with the right turn signal and may be operated in any of the manners described above with respect to the actuation of light sources 38*a-c*.

According to one embodiment, the controller 42 may also generate a hazard signal when the hazard switch 52 is switched ON. In such an instance, the hazard signal may prompt headlights 44*a*, 44*b*, side mirror lights 46*a*, 46*b*, and taillights 48*a*, 48*b* to blink in unison. Additionally, light sources 38*a-f* may be actuated in various combinations to induce luminescence of the associated photoluminescent structures 28*a-f* in a similar blinking pattern to headlights 44*a*, 44*b*, side mirror lights 46*a*, 46*b*, and taillights 48*a*, 48*b*.

Figure 7:
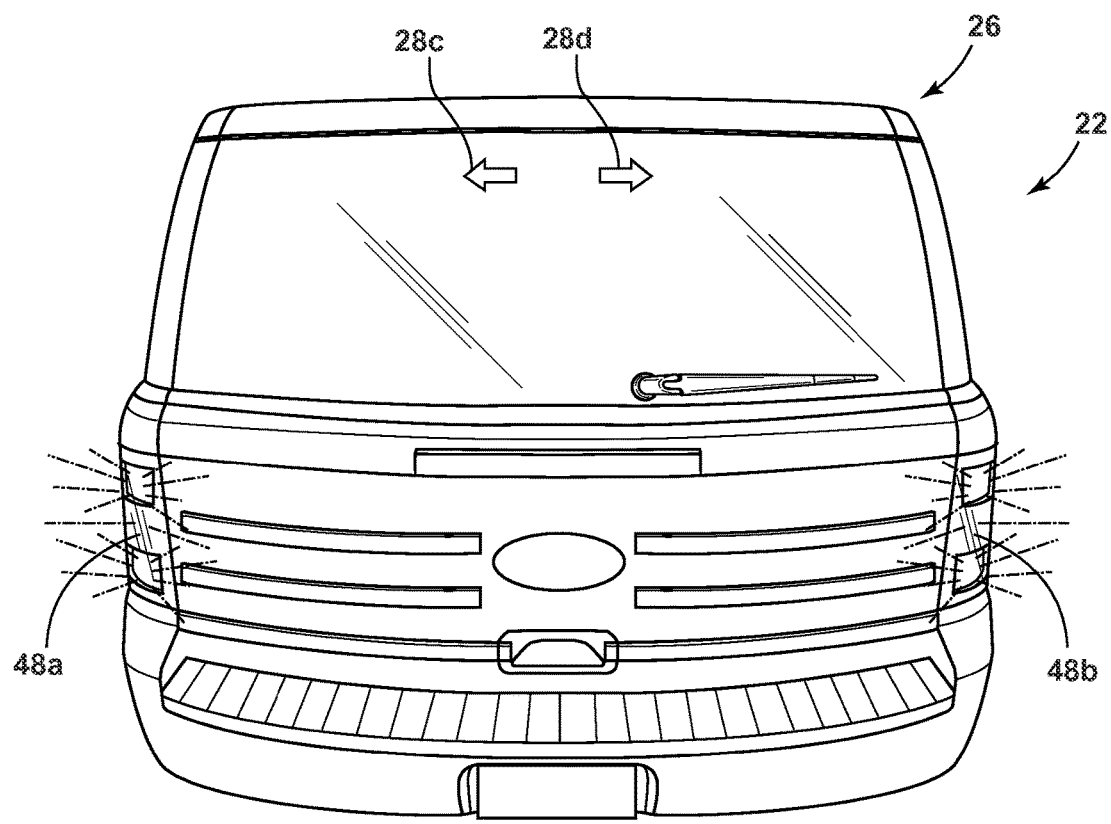
FIGS. 7-9 illustrate a luminescence pattern for indicating a hazard signal.
Figure 8:
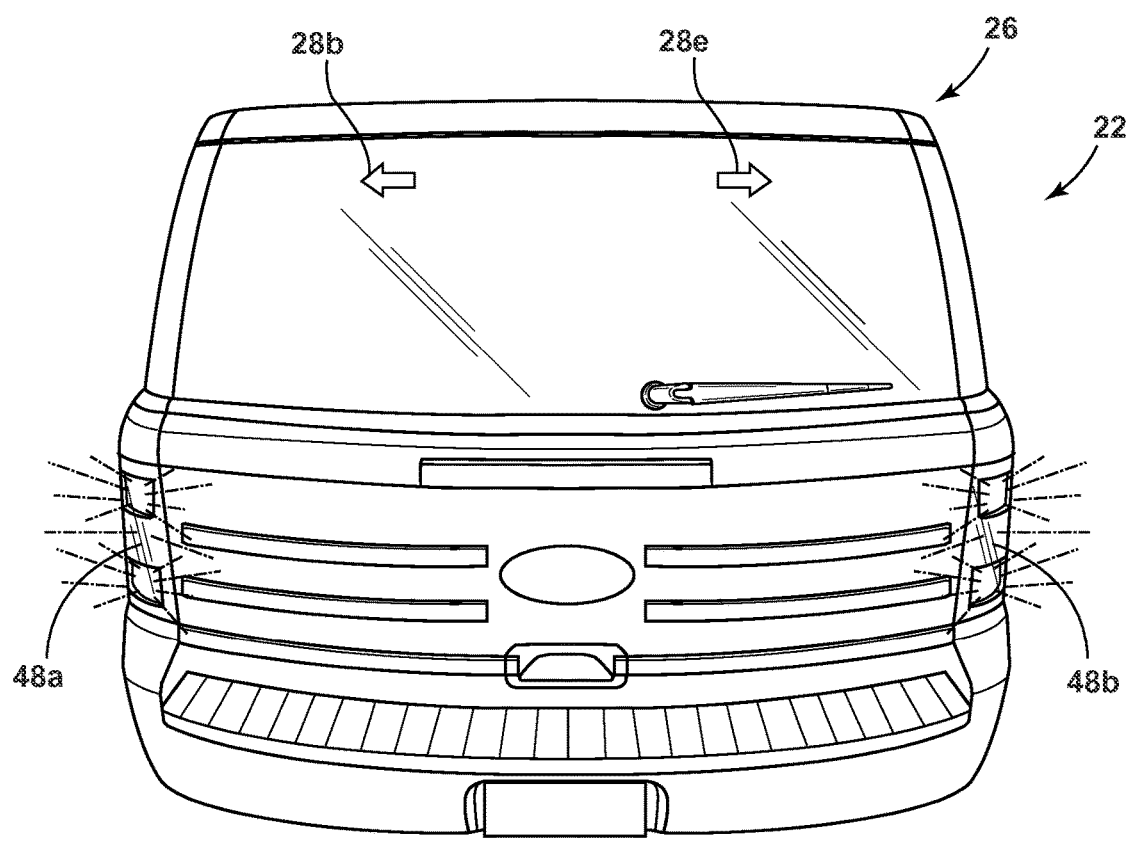
Figure 9:
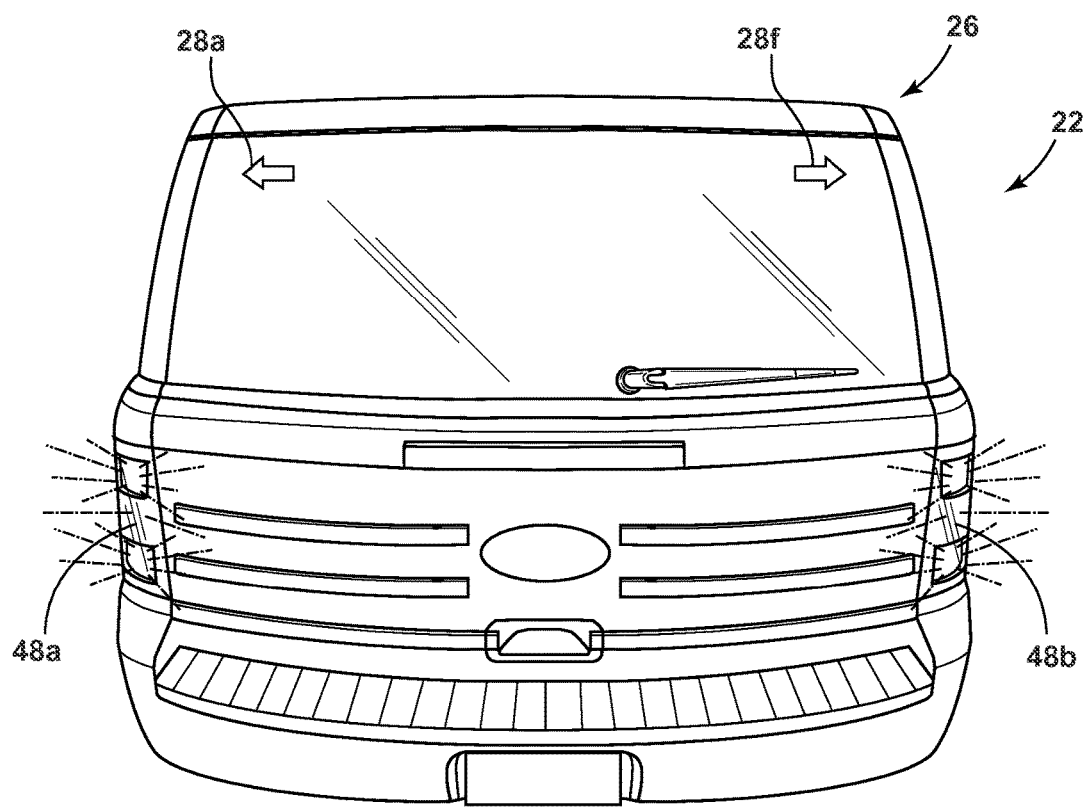

For example, the light sources 38*a-f* may be actuated such that the associated photoluminescent structures 28*a-f* luminesce in concert or in succession, as described above. In one embodiment, light sources 38*c* and 38*d* may be actuated in concert to induce luminescence of photoluminescent structures 28*c* and 28*d* for the approximate duration of the first blink of taillights 48*a* and 48*b* (FIG. 7). Thereafter, light sources 38*b* and 38*e* may be actuated in concert to induce luminescence of photoluminescent structures 28*b* and 28*e* for the approximate duration of the second blink of taillights 48*a* and 48*b* (FIG. 8). Finally, light sources 38*a* and 38*f* may be actuated in concert to induce luminescence of photoluminescent structures 28*a* and 28*f* for the approximate duration of the third blink of taillights 48*a* and 48*b* (FIG. 9). This aforementioned luminescence pattern may be repeated so long as the hazard switch 52 is switched to ON. While not shown, it is further contemplated that the light sources 38*a-f* may be actuated in any combination in conjunction with a brake signal or other vehicle status signal.

With respect to the embodiments described above, the light sources 38*a-f* may each be configured to emit light having a wavelength of approximately 450-495 nanometers (e.g., blue light) and may be embodied as light emitting diodes (LEDs). In alternative embodiments, the light sources 38*a-f* may be configured to emit light of a different wavelength, such as UV light or violet light. In response, the photoluminescent structures 28*a-f* may be configured to down convert light received from the associated light sources 38*a-f* into light having a wavelength in the visible spectrum (~390-700 nanometers in wavelength). According to one embodiment, each photoluminescent structure 28*a-f* is configured to convert blue light into red light having a wavelength of approximately 620-750 nanometers or other visible light.

Accordingly, a rear vehicle light system has been advantageously described herein. The system benefits from one or more photoluminescent structures configured to luminesce in order to provide a vehicle status indication.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A rear vehicle light system comprising:
   a first plurality of photoluminescent structures coupled to a rear windshield and arranged as arrows aligned head-to-tail in a first direction;
   a second plurality of photoluminescent structures coupled to the rear windshield and arranged as arrows aligned head-to-tail in a second direction; and
   a plurality of light sources, each configured to excite a uniquely associated photoluminescent structure and sequentially actuate based on a position of a turn signal lever.

2. The system of claim 1, wherein the first plurality of photoluminescent structures indicate a left turn when excited and the second plurality of photoluminescent structures indicate a right turn when excited.

3. The system of claim 1, wherein when the turn signal lever is moved to a left turn position and, the first plurality of photoluminescent structures are excited by the corresponding light sources to luminesce intermittently and in succession so as to give the impression that the arrows are moving across the rear windshield in the first direction.

4. The system of claim 3, wherein when the turn signal lever is moved to a right turn position, the second plurality of photoluminescent structures are excited by the corresponding light sources to luminesce intermittently and in succession so as to give the impression that the arrows are moving across the rear windshield in the second direction.

5. The system of claim 1, wherein each light source is configured to emit blue light.

6. The system of claim 1, wherein each light source is coupled to a vehicle headliner.

7. The system of claim 1, wherein each light source is actuated in conjunction with a hazard signal such that the first and second plurality of photoluminescent structures luminesce in a blinking pattern.

8. A rear vehicle light system comprising:
a first plurality of photoluminescent structures coupled to a rear windshield and arranged as arrows aligned horizontally head-to-tail in a leftward direction;
a second plurality of photoluminescent structures coupled to the rear windshield and arranged as arrows aligned horizontally head-to-tail in a rightward direction; and
a plurality of light sources, each configured to excite a uniquely associated photoluminescent structure and sequentially actuate in conjunction with a turn signal.

9. The system of claim 8, wherein the first plurality of photoluminescent structures indicate a left turn when excited and the second plurality of photoluminescent structures indicate a right turn when excited.

10. The system of claim 8, wherein the first and second plurality of photoluminescent structures are arranged across an upper portion of the rear windshield.

11. The system of claim 8, wherein when the turn signal indicates a left turn, the first plurality of photoluminescent structures are excited by the corresponding light sources to luminesce intermittently and in succession so as to give the impression that the arrows are moving across the rear windshield in the leftward direction.

12. The system of claim 11, wherein when the turn signal indicates a right turn, the second plurality of photoluminescent structures are excited by the corresponding light sources to luminesce intermittently and in succession so as to give the impression that the arrows are moving across the rear windshield in the rightward direction.

13. The system of claim 8, wherein each light source is coupled to a vehicle headliner.

14. The system of claim 8, wherein each light source is actuated in conjunction with a hazard signal such that the first and second plurality of photoluminescent structures luminesce in a blinking pattern.

15. A rear vehicle light system comprising:
a first plurality of photoluminescent structures coupled to a rear windshield and arranged as arrows aligned head-to-tail in a first direction;
a second plurality of photoluminescent structures coupled to the rear windshield and arranged as arrows aligned head-to-tail in a second direction opposite to the first direction; and
a plurality of light sources, each configured to excite a uniquely associated photoluminescent structure and sequentially actuate in conjunction with one of a left turn signal and a right turn signal.

16. The system of claim 15, wherein the first plurality of photoluminescent structures indicate a left turn when excited and the second plurality of photoluminescent structures indicate a right turn when excited.

17. The system of claim 15, wherein when the left turn signal is active, the first plurality of photoluminescent structures are excited by the corresponding light sources to luminesce intermittently and in succession so as to give the impression that the arrows are moving across the rear windshield in the first direction.

18. The system of claim 17, wherein when the right turn signal is active, the second plurality of photoluminescent structures are excited by the corresponding light sources to luminesce intermittently and in succession so as to give the impression that the arrows are moving across the rear windshield in the second direction.

19. The system of claim 15, wherein each light source is coupled to a vehicle headliner.

20. The system of claim 15, wherein each light source is actuated in conjunction with a hazard signal such that the first and second plurality of photoluminescent structures luminesce in a blinking pattern.

* * * * *